Figure 4:
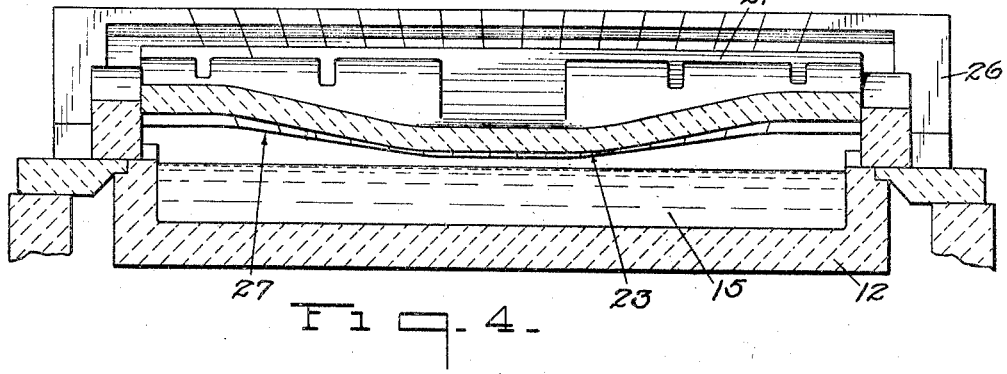

Jan. 10, 1928.
E. T. FERNGREN
1,655,992
GLASS APPARATUS AND LIP TILE THEREFOR
Filed March 14, 1925        2 Sheets-Sheet 1
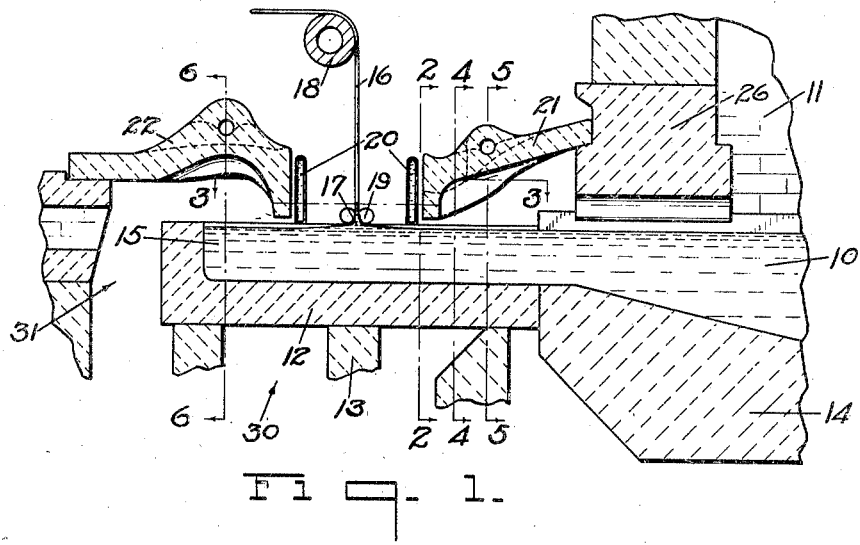
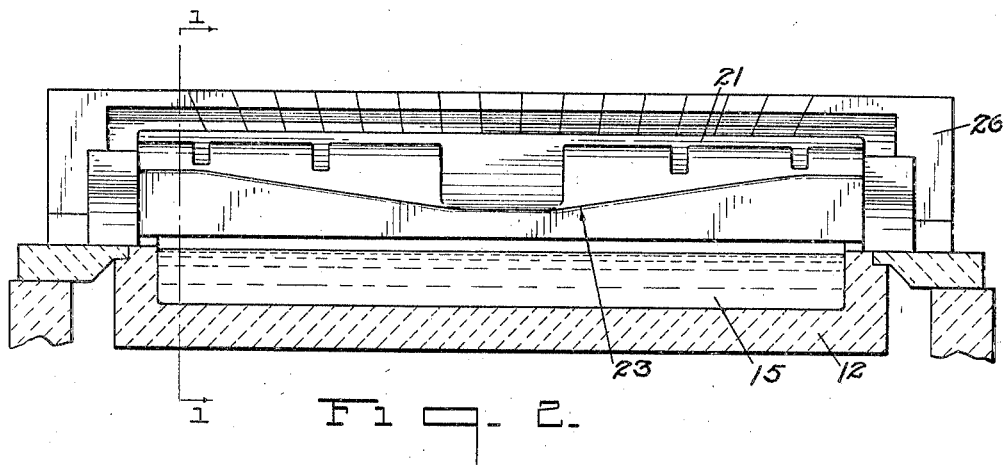
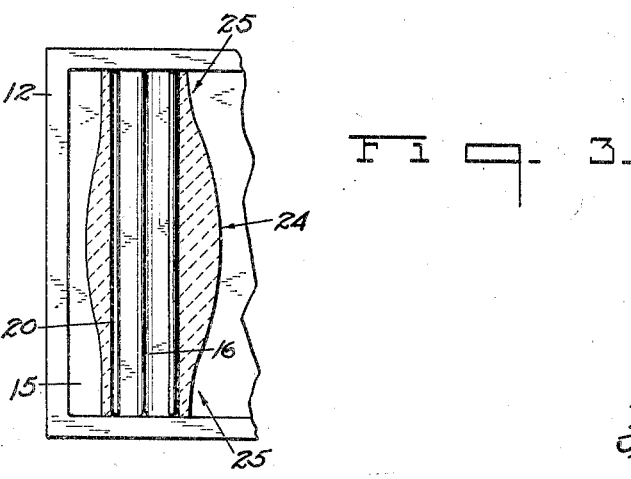
INVENTOR.
Enoch T. Ferngren.
Frank Fraser,
ATTORNEY.

Jan. 10, 1928.

E. T. FERNGREN 1,655,992

GLASS APPARATUS AND LIP TILE THEREFOR

Filed March 14, 1925    2 Sheets-Sheet 2

INVENTOR.
Enoch T. Ferngren.
Frank Fraser
ATTORNEY.

Patented Jan. 10, 1928.

1,655,992

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

GLASS APPARATUS AND LIP TILE THEREFOR.

Application filed March 14, 1925. Serial No. 15,476.

The present invention relates to sheet glass apparatus, and has particular reference to an apparatus wherein a sheet is continuously drawn from a mass of molten glass.

An important object of the invention is to provide sheet glass apparatus wherein a sheet is continuously drawn from a mass of molten glass, and includes means adapted to make uniform the temperature of the glass entering the sheet and the flow movement thereof.

Another object of the invention is to provide sheet glass apparatus of this nature including means for controlling the action of radiated heat in a manner to equalize the temperature condition of the entire width of the stream of glass flowing toward the point of draw.

A still further object of the invention is to provide sheet glass apparatus of this nature adapted to concentrate radiated heat along and above the border portions of the flow of glass moving toward the point of draw while at the same time the heating of the central flow is relatively much less than that of the side portions.

It is also an object of the invention to bring about such a control over air movements and the heating and cooling atmospheres that are present over the surface of the glass that a more uniform tractability be given to the surface glass along the entire line of draw to the end that the sheet produced may be of even thickness.

Other objects and advantages of the invention will become apparent during the course of the following description.

In the drawings wherein like numerals are employed to designate like parts throughout the same.

Fig. 1 is a vertical longitudinal section through a portion of the apparatus showing the invention in use.

Figure 5:
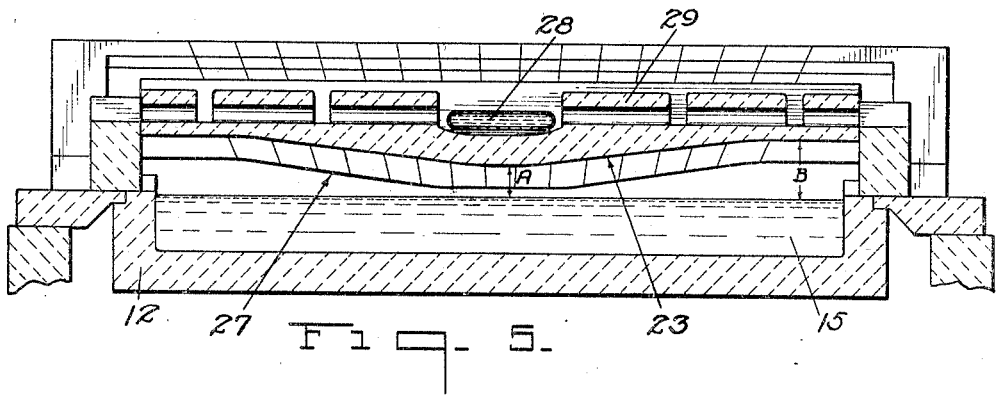
Figure 6:
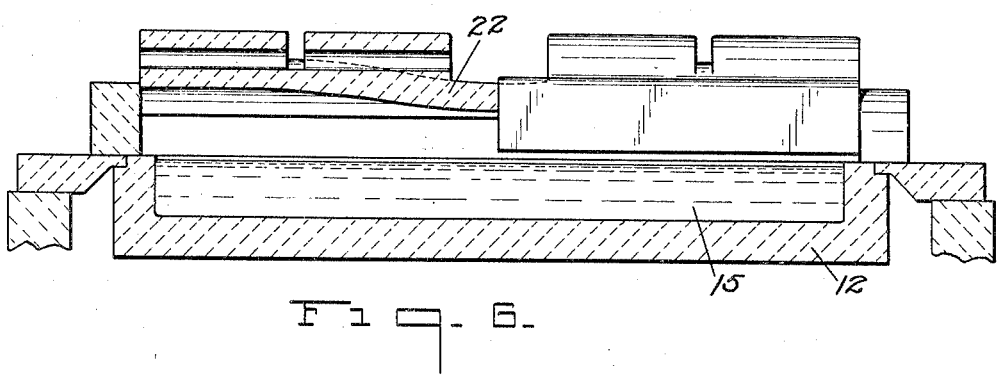

Fig. 2 is a section on line 2—2 in Fig. 1.
Fig. 3 is a section on line 3—3 of Fig. 1.
Fig. 4 is a section on line 4—4 in Fig. 1.
Fig. 5 is a section on line 5—5 in Fig. 1.
Fig. 6 is a section on line 6—6 in Fig. 1.

The type of apparatus disclosed in the drawings is that covered in the Colburn Patent 1,248,809, granted Dec. 4, 1917, wherein a mass of molten glass 10 is formed in the tank furnace 11 which connects with the open end of a so-called draw-pot 12 supported upon the stools or the like 13. A goose-neck 14 connects the draw-pot 12 and the tank furnace 11, so that the pool of molten glass 15 in the pot will be relatively more shallow than the mass 10 in the furnace.

The sheet 16 is continuously drawn from the sheet source 17, the said sheet being trained over a bending member 18 whereby the sheet may be run in a horizontal plane over a flattening table and through an annealing leer. Sheet edge engaging rolls 19 are provided to assist in forming an edge on the sheet and holding the same to width. Water-cooled heat absorbing means or shields 20 are provided to prevent heat rays from striking the sheet 16 during its vertical run and also absorb sufficient heat from the surface of the glass flowing to the sheet to make it of the proper consistency.

The Colburn patent also discloses cover or lip-tiles 21 and 22 respectively which retain the heat rays moving toward the sheet within the apparatus and to prevent them from striking the sheet. The lip-tiles disclosed in this patent are perfectly flat in transverse plane so that any two points in the same plane would be equidistant from the surface of the glass flowing therebeneath.

It is an aim of the present invention to shape the lip-tile in a manner that the heat rays or radiant heat issuing from the tank furnace 11 will be deflected from the center toward the sides, thus concentrating the heating action as far as possible to the border portions of the flow of molten glass toward the point of draw. In addition to deflecting the heat rays toward the side portions of the apparatus the lip-tiles are so constructed that a greater volume of heated atmosphere can be positioned over the border portions of the glass than in the center. The reason that this greater heating action is desired along the border portions of the glass is that the glass flowing through a channel formed from refractory materials is always relatively cool along the border portions and relatively hot in the center. This is caused by heat absorption and other heat losses taking place by contact of the glass with the side walls of the container, and also due to the fact that the glass has an inherent tendency to adhere to such objects. Thus the glass flowing toward the sheet along the border portions moves relatively slower than the central flow of glass, resulting in an unequal replacement movement toward the sheet source 17, and also inequalities in the sheet because of differences in temperature through its entire width.

The lip-tiles are constructed substantially as shown in the drawings presenting a downwardly arched portion or surface 23 so that the distance A will be relatively shorter than the distance B making it possible for greater heat volumes at the two sides than in the center. This is clearly shown in the sectional views. In addition, as is shown in Fig. 3, the lip-tile is relatively wedge-shaped as indicated by the numeral 24, so that the heat rays passing from the tank 11 will be deflected toward the side portions 25 in Fig. 3.

In factory practice with the old type of lip-tile, the gaseous atmosphere in the space under each tile will normally have its greatest expansive force centrally of this space due to its location over the hottest portion of the glass flow and the greater impact or intensity of radiant heat energy at this point.

The atmosphere present at the opposite end spaces under the lip-tiles is much less exposed to heat action due to an active outward radiation of heat from the glass and the refractory parts surrounding and holding it.

These normally prevailing conditions are the cause of setting up heat-carrying convection currents in and off the atmosphere under each tile, the cold outer air almost exclusively flowing into the space under the end portions of the tiles, and after being heated pushing out from the median section of the space under each tile. This circulating action of the atmosphere under the tiles and the thrusting out of the heated atmosphere at the central portion of the tile reduces the heat absorbing action of the coolers on the glass surface at the central portion of the glass body on each side of the sheet as it is being drawn and tends to reduce the thickness of the sheet centrally thereof.

Each of the lip-tiles 21 and 22 now shown will cause the heated air or gaseous atmosphere to flow toward the end portions of the space under the tiles, and thus cause the presence of and constant maintenance of a greater body and column of highly heated atmosphere over the side portions of the glass in the pot.

The greater buoyancy and pressure thus given to the heating atmosphere at the end spaces under each tile checks the greater portion of the cold air inflow at these points, and thus eliminates excessive cooling of the glass surface adjacent to the side walls of the pot which will reduce the clinging of the surface glass to the walls of the pot.

On the other hand there will now also be no exhaust of heated atmosphere from under the central portion of the forward face of the tiles instead of which a cold air inflow is established due to the direction of movement given to the convection currents by the inverted arching of the central body portion of each title.

This way of balancing the pressure of the heating atmosphere under each tile as against the pressure of the colder outside atmosphere and the thereby established control over the ratio or gradient of cold air inflow next to the glass surface is beneficial in locating the maximum of glass surface cooling action under the lip-tiles by reason of outside atmosphere inflow, at the point where the temperature of the surface glass is highest, thereby increasing its tractability where most needed and insuring a more uniform thickness in the sheet drawn.

To further assist in this deflection and control of the radiated heat from the tank, the jack-arch 26, which is used in all Colburn machines, is also arched as indicated by 27 in Fig. 5. Heat-absorbing means 28 may be positioned centrally of the lip-tile to further assist in reducing the temperature of the glass under this point. The lip-tile is provided with a plurality of apertured ears 29 by which means it may be supported in a manner that it may easily be replaced when desired. Furthermore, the lip-tile may be made in a number of sections to facilitate handling thereof.

The lip-tile 21 takes care of the radiated heat from the furnace, while the tile 22 takes care of the heat rays or currents created by the heating means employed to heat the firebox 30 which pass through the channel 31. The shape of the two lip-tiles is slightly different but the same principle is employed in both.

Although the lip-tiles are discussed as used in conjunction with the Colburn machine it is to be understood that the same type of construction can be used in any glass apparatus where it is desirable to have a uniform flow movement and uniform temperature of the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, means for drawing a sheet from a mass of molten glass, and a tile arranged above the glass, the center portion thereof being relatively closer to the glass than the sides to permit a greater volume of heat above the side portions of the glass than in the center.

2. In sheet glass apparatus, means for drawing a sheet from a mass of molten glass, and a tile arranged above the glass, said tile being relatively closer to the glass at the center than at its edges and being shaped to deflect heat rays radiated from the glass toward the sides thereof to create relatively larger heat volumes at the border portions of the glass than in the center.

3. In sheet glass apparatus, means for drawing a sheet from a mass of molten glass, a tile arranged above the glass to retain heat radiated from the glass in proximity thereto, and means for absorbing heat from the central portion of the tile.

4. In sheet glass apparatus, means for drawing a sheet from a mass of molten glass, a tile arranged above the glass to retain heat radiated from the glass in proximity thereto, and a cooler arranged above the center of the tile to absorb heat from the central portion thereof.

5. In sheet glass apparatus, a tank furnace having a mass of molten glass therein, a draw-pot in open communication with the tank furnace, means to draw a sheet from the glass in the draw-pot, a tile arranged above the glass in the draw-pot to deflect radiated heat from the tank furnace toward the sides of said draw-pot, the central portion of the lip-tile relatively closer to the glass than the ends thereof.

6. In sheet glass apparatus, a tank furnace having a mass of molten glass therein, a draw-pot in open communication therewith, means to draw a sheet from the glass in the draw-pot, cover-tiles arranged above the glass and one on both sides of the sheet, said cover-tiles deflecting heat rays moving toward the sheet, to the sides of the molten glass, the central portion of the tiles being relatively closer to the glass than the ends whereby greater volumes of heat may be concentrated along the border portions of the glass from which the sheet is drawn.

7. In sheet glass apparatus, a tank furnace having a mass of molten glass therein, a draw-pot in open communication therewith, and a jack-arch between the tank furnace and the draw-pot, said jack-arch being arched downwardly at its center for the purposes specified.

Signed at Toledo, in the county of Lucas and State of Ohio, this 10th day of March, 1925.

ENOCH T. FERNGREN.